United States Patent
Shon et al.

(10) Patent No.: US 8,412,939 B2
(45) Date of Patent: Apr. 2, 2013

(54) SYSTEM AND METHOD FOR MUTUAL AUTHENTICATION BETWEEN NODE AND SINK IN SENSOR NETWORK

(75) Inventors: Tae-Shik Shon, Suwon-si (KR); Yong-Suk Park, Seoul (KR); Soon-Seob Han, Seoul (KR); Kwang-Jo Kim, Daejeon (KR); Kyu-Suk Han, Daejeon (KR); Jang-Seong Kim, Daejeon (KR)

(73) Assignees: Samsung Electronics Co., Ltd (KR); Korea Advanced Institute of Science and Technology (KAIST) (KR)

( * ) Notice: Subject to any disclaimer, the term of this patent is extended or adjusted under 35 U.S.C. 154(b) by 351 days.

(21) Appl. No.: 12/821,577

(22) Filed: Jun. 23, 2010

(65) Prior Publication Data
US 2010/0332830 A1   Dec. 30, 2010

(30) Foreign Application Priority Data
Jun. 25, 2009   (KR) .................. 10-2009-0057175

(51) Int. Cl.
*H04L 29/06* (2006.01)
(52) U.S. Cl. .......................... 713/168; 726/3
(58) Field of Classification Search .................. 713/168; 726/3
See application file for complete search history.

(56) References Cited

U.S. PATENT DOCUMENTS

| | | | | |
|---|---|---|---|---|
| 7,292,842 B2 * | 11/2007 | Suzuki | .......................... | 455/411 |
| 7,346,772 B2 * | 3/2008 | Rebo et al. | ..................... | 713/155 |
| 7,756,510 B2 * | 7/2010 | Lee et al. | ...................... | 455/411 |
| 2006/0268796 A1 * | 11/2006 | Watanabe et al. | ............. | 370/338 |
| 2007/0011435 A1 * | 1/2007 | Lee | ................................. | 712/15 |
| 2007/0060127 A1 * | 3/2007 | Forsberg | ....................... | 455/436 |
| 2008/0162939 A1 * | 7/2008 | Lee et al. | ...................... | 713/171 |
| 2009/0060200 A1 * | 3/2009 | Sheu et al. | .................... | 380/278 |
| 2009/0138617 A1 * | 5/2009 | Veillette | ........................ | 709/238 |
| 2010/0115272 A1 * | 5/2010 | Batta | ............................. | 713/162 |
| 2010/0329463 A1 * | 12/2010 | Ratliff et al. | .................. | 380/279 |
| 2010/0332831 A1 * | 12/2010 | Shon et al. | .................... | 713/168 |
| 2011/0126015 A1 * | 5/2011 | Shon et al. | .................... | 713/171 |

FOREIGN PATENT DOCUMENTS

| | | |
|---|---|---|
| KR | 1020060104838 | 10/2006 |
| KR | 1020080086137 | 9/2008 |
| KR | 1020090002328 | 1/2009 |

OTHER PUBLICATIONS

Huang et al., "Fast Authenticated Key Establishment Protocols for Self-Organizing Sensor Networks", Mitsubishi Electric Research Laboratories, TR2003-102, Feb. 2004.

* cited by examiner

*Primary Examiner* — Michael Pyzocha
(74) *Attorney, Agent, or Firm* — The Farrell Law Firm, P.C.

(57) ABSTRACT

Disclosed a system and method for mutual authentication between a node and a sink in a sensor network. At least one sink periodically creates a neighboring sink list including information on at least one adjacent sink, and the sink requests node authentication to a base station when receiving an authentication request from the node and transmits its own neighboring sink list to the node when the node authentication has been completed. When the node moves and requests authentication to another sink, the another sink stores a neighboring sink list received from the node, determines if a node-authenticable sink exists in its own neighboring sink list according to the authentication request, and requests re-authentication of the node to the node-authenticable sink when the node-authenticable sink exists, so that re-authentication between the node and the sink is easily performed.

20 Claims, 13 Drawing Sheets

SYSTEM AND METHOD FOR MUTUAL AUTHENTICATION BETWEEN NODE AND SINK IN SENSOR NETWORK

PRIORITY

This application claims priority to an application filed with the Korean Intellectual Property Office on Jun. 25, 2009 and assigned Serial No. 10-2009-0057175, the content of which are hereby incorporated by reference.

BACKGROUND OF THE INVENTION

1. Field of the Invention

The present invention relates generally to a mutual authentication system and method in a sensor network, and more particularly to a system and method for mutual authentication between a node and a sink using a public key in a sensor network.

2. Description of the Related Art

In a general sensor network, when a node requests connection to a first sink, which is accessing a sensor network, the first sink transfers information on the node to a second sink connected to the first sink, and the transferred node information is forwarded to a Base Station (BS) through mutually connected sinks. When the BS has received the node information, the BS performs an authentication process with respect to the node, and transfers authentication information to the first sink. When the first sink has received the authentication information related to the node, the first sink determines whether or not to authenticate the node, and authenticates or rejects the node according to a result of the determination.

In such a sensor network, mutual authentication between a node and a sink is performed using various schemes, such as a scheme in which a BS controls the authentication of sensors in order to authenticate a device newly participating in the sensor network, and either to create a link key with an authenticated node or to reduce the operation load of sensors.

As described above, according to the conventional scheme, in order to perform mutual authentication between a node and a sink, the sink transmits node information to a BS and receives authentication information from the BS.

However, whenever a sink and a node are to be connected with each other, a request for authentication of the node must be sent to a BS. Consequently, in a multi-hop environment, there is difficulty in that a plurality of sinks must be traversed to transfer node information to the BS and to receive authentication information from the BS.

In addition, even when an authenticated node moves and is connected to another sink, authentication must again be performed through the aforementioned operations, creating an inconvenience in that the authenticated node must repeatedly perform the authentication operation with the sinks whenever the authentication node moves.

Moreover, when authentication is performed through a BS in a sensor network of a multi-hop environment, many sinks must be traversed upon performing the authentication, greatly increasing overhead resources. Further, the sink detection time and the amount of overhead may increase by geometric progression according to an increase in the number of hops.

SUMMARY OF THE INVENTION

Accordingly, the present invention has been made to solve at least the above-mentioned problems occurring in the prior art, and to provide a mutual authentication system and method for performing authentication between a node and a sink through the use of a public key, and easily performing authentication with another sink even when an authenticated node moves.

In accordance with an aspect of the present invention, there is provided a system for mutual authentication between a node and a sink in a sensor network. The system includes a node for requesting authentication or re-authentication to one sink among one of more sinks; a first sink for sending a request for authentication of the node to a base station when receiving an authentication request from the node, receiving node authentication information from the base station, and authenticating the node; and a second sink for requesting the node authentication information to the first sink when receiving a re-authentication request from the node, receiving the node authentication information from the first sink, and re-authenticating the node.

In accordance with another aspect of the present invention, there is provided a method for mutual authentication between a node and a sink in a sensor network which includes the node, a plurality of sinks, and a base station. The method includes: requesting, by the node, authentication to a first sink among the plurality of sinks; requesting, by the first sink, authentication of the node to the base station according to the authentication request; receiving, by the first sink, node authentication information from the base station, and authenticating the node; requesting, by the node, re-authentication to a second sink among the plurality of sinks; requesting, by the second sink, the node authentication information to the first sink according to the re-authentication request; and receiving, by the second sink, the node authentication information from the first sink, and re-authenticating the node.

In accordance with another aspect of the present invention, there is provided a method for mutual authentication between a first sink and a node in a sensor network which includes the node, a plurality of sinks, and a base station. The method includes: requesting, by the first sink, authentication of the node to the base station when receiving an authentication request from the node; authenticating, by the first sink, the node when receiving authentication information on the node from the base station; and transmitting, by the first sink, the authentication information on the node to a second sink when receiving a request for re-authentication of the node from the second sink.

BRIEF DESCRIPTION OF THE DRAWINGS

The above and other aspects, features and advantages of the present invention will be more apparent from the following detailed description taken in conjunction with the accompanying drawings, in which:

FIG. 7 is a view explaining the neighboring sink list of a second sink according to an embodiment of the present invention;

FIGS. 9A and 9B are a view explaining the neighboring sink lists of first and second sinks according to an embodiment of the present invention.

DETAILED DESCRIPTION OF THE INVENTION

Hereinafter, various embodiments of the present invention will be described with reference to the accompanying drawings. In the following description, a detailed description of known functions and configurations incorporated herein will be omitted when it may make the subject matter of the present invention rather unclear.

Figure 1:
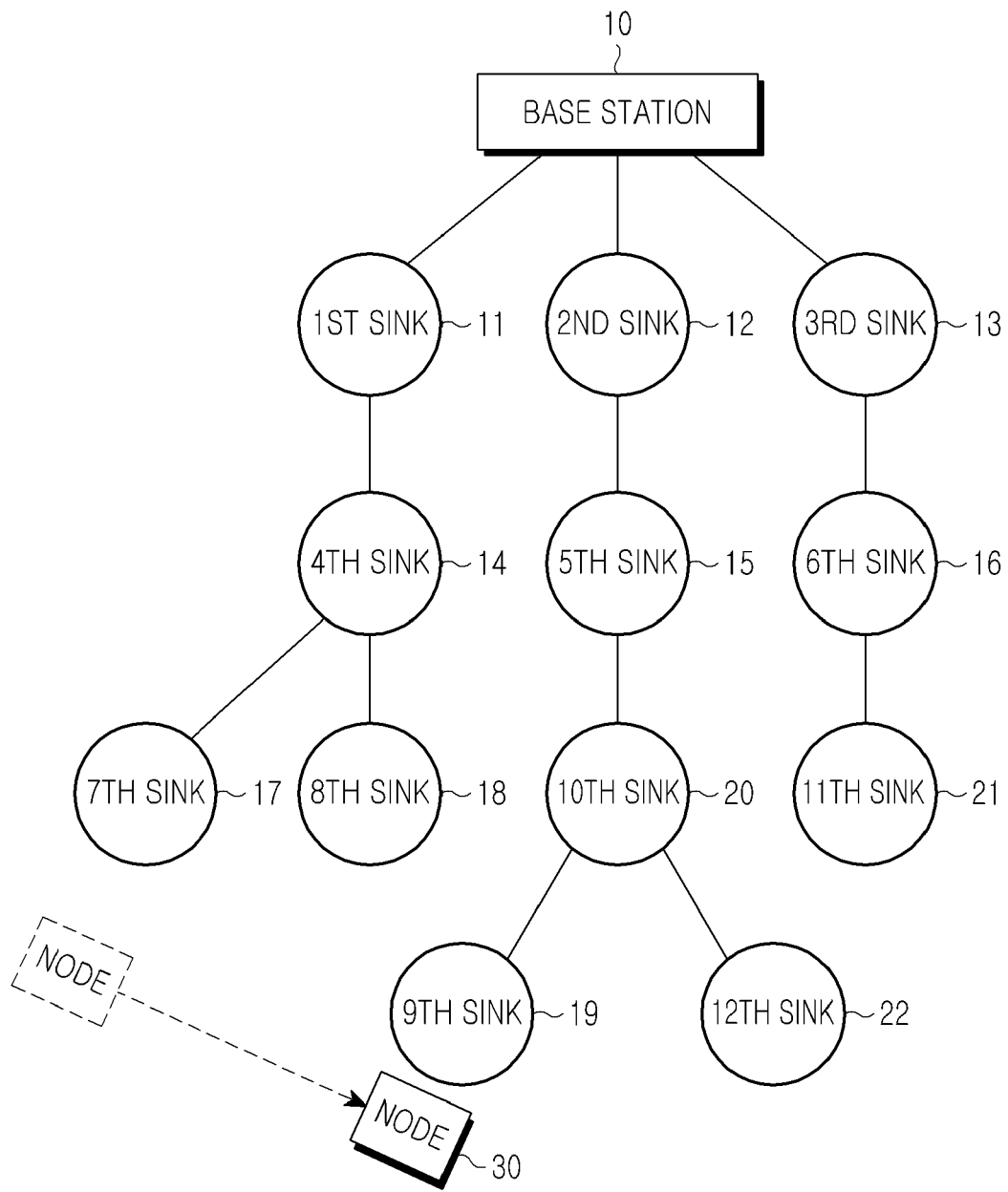
FIG. 1 is a block diagram illustrating the configuration of a sensor network according to an embodiment of the present invention.

FIG. 1 is a block diagram illustrating a configuration of a sensor network according to an embodiment of the present invention.

First, the sensor network according to an embodiment of the present invention includes a Base Station (BS) 10, a plurality of sinks, i.e. first to twelfth sinks 11-22, and a node 30. Here, there is no limitation in the number of sinks. Also, the BS and each sink are connected in a multi-hop manner, and sinks are connected to each other in a single hop manner. Generally, the plurality of sinks and the BS make up a kind of node.

It is assumed that each of the sinks, i.e., the first sink (S1) 11 to the twelfth sink (S12) 22, has a public/secret key pair, such as the first sink's public key pk_S1 and the first sink's secret key sk_S1, the second sink's public key pk_S2 and the second sink's secret key sk_S2, . . . , the twelfth sink's public key pk_S12 and the twelfth sink's secret key sk_S12. In addition, it is assumed that signatures, such as "cert_S1=sign (sk_BS, h(S1∥ pk_S1))," "cert_S2=sign (sk_BS, h(S2∥ pk_S2))," and "cert_S12=sign (sk_BS, h(S12∥ pk_S12))," are affixed with respect to the respective public keys. Here, cert_S1 represents that the public key pk_S1 of the first sink (S1) 11 is signed with the BS's secret key sk_BS. Also, it is assumed that the respective nodes already share the BS's public key pk_BS.

In the sensor network configured as illustrated in FIG. 1, each sink periodically searches for neighboring sinks, shares public keys with the neighboring sinks, and creates a neighboring sink list representing a list of adjacent sinks through the use of the public keys. In addition, each sink checks if there is an adjacent node or adjacent sink around the sink, and either creates a neighboring sink list or performs an initial authentication or re-authentication procedure for the adjacent node according to the adjacent node or adjacent sink.

This will now be described in detail with reference to FIG. 2. According to an embodiment of the present invention, the following description will be given on the assumption that the first sink 11 performs an adjacent sink search and node authentication.

Figure 2:
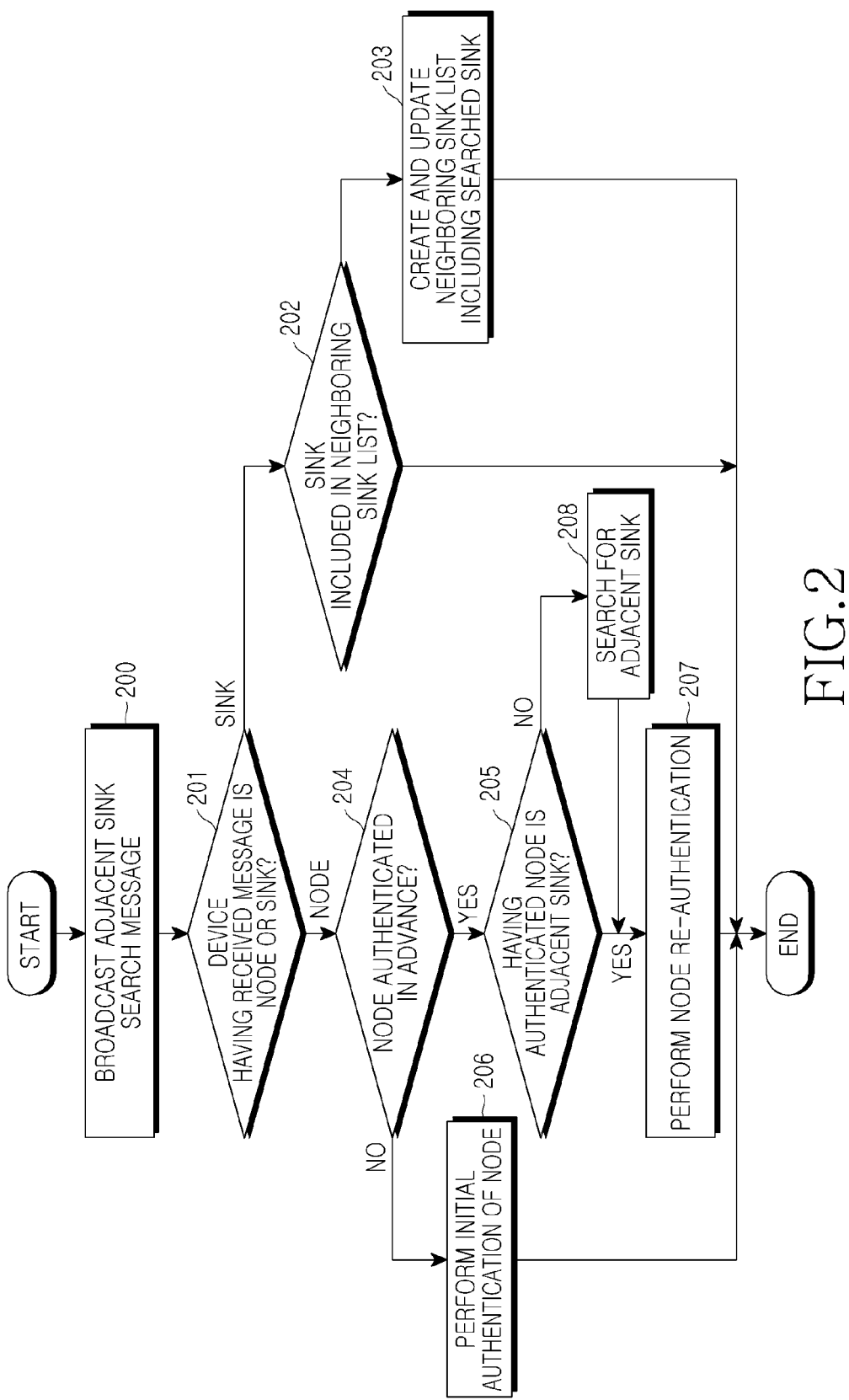
FIG. 2 is a flowchart illustrating the entire authentication procedure between a node and a sink in a sensor network according to an embodiment of the present invention.

FIG. 2 is a flowchart illustrating the entire authentication procedure between a node and a sink in a sensor network according to an embodiment of the present invention.

First, in step 200, the first sink 11 periodically broadcasts a message, e.g. a HELLO message, which is an adjacent sink search message, and related information to adjacent sinks which are located around the first sink 11.

Specifically, the first sink (S1) 11 periodically creates a HELLO message and a time stamp TS, which represents a message creation time, and creates authentication information "v[0]=sign{sk_S1, h(HELLO∥ TS)}," representing that the created HELLO message and time stamp are the HELLO message and time stamp of the first sink 11. Thereafter, the first sink 11 periodically broadcasts the created HELLO message, the time stamp, v[0], the public key pk_S1 of the first sink (S1) 11, and a certificate cert_S1, representing that the public key of the first sink (S1) 11 is pk_S1.

In step 201, the first sink 11 determines if a device receiving the HELLO message, broadcast by the first sink 11 in step 200, is a sink or a node, proceeds to step 202 when the device receiving the HELLO message is a sink, and proceeds to step 204 when the device receiving the HELLO message is a node.

In step 202, performed when the device receiving the HELLO message is a sink, i.e. an adjacent sink, the first sink 11 determines if the adjacent sink is included in its own neighboring sink list. If the adjacent sink is included in its own neighboring sink list, the first sink 11 terminates the procedure, and if not, the first sink 11 proceeds to step 203.

In step 203, the first sink 11 creates a neighboring sink list including information on a searched sink, and terminates the procedure. If the first sink 11 has created a neighboring sink list in advance, the first sink 11 adds the information on the searched sink to its own neighboring sink list. The neighboring sink list represents a list including information on sinks located near a corresponding sink. Each sink periodically searches for adjacent sinks and updates its own neighboring sink list.

When the device receiving the HELLO message is a node in step 201, the first sink 11 determines if the searched node is an already authenticated node in step 204. If the searched node is an already authenticated node, the first sink 11 proceeds to step 205, and if not, the first sink 11 proceeds to step 206, where the first sink 11 performs initial authentication for the searched node and terminates the procedure.

In step 205, the first sink 11 determines if a sink having authenticated the searched node is a sink adjacent to the first sink 11. When the sink having authenticated the searched node is a sink adjacent to the first sink 11, the first sink 11 proceeds to step 207, and if not, the first sink 11 proceeds to step 208, where the first sink 11 searches for adjacent sinks. Here, the first sink 11 determines if a sink is adjacent to the first sink 11 through the use of its own neighboring sink list created in advance.

In step 207, performed after step 205 or 208, the first sink 11 performs re-authentication for the searched node through the use of an adjacent sink, and terminates the procedure.

As described above, according to the present invention, authentication between a node and a sink can be easily performed without passing through a BS.

Figure 3:
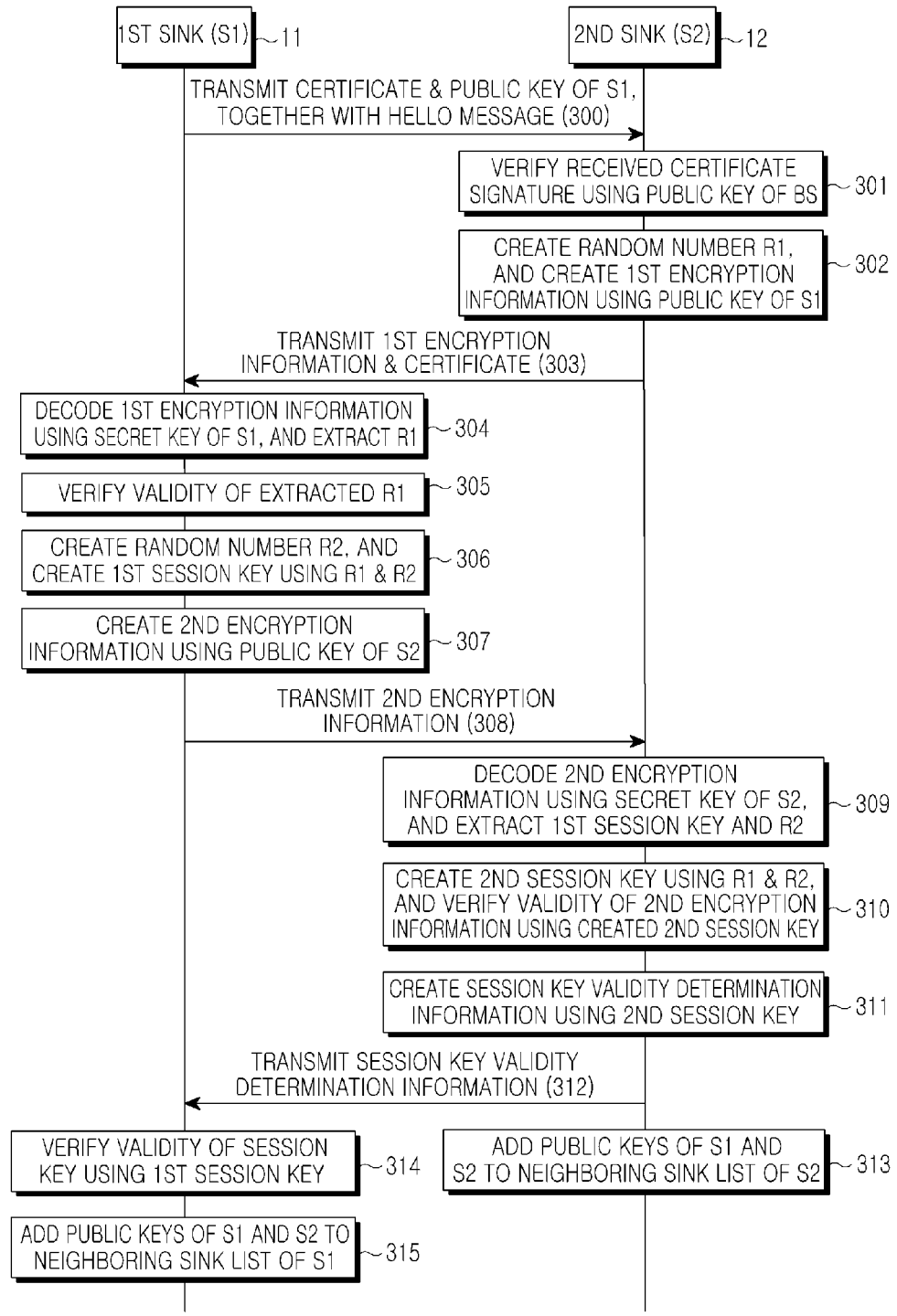
FIG. 3 is a flowchart illustrating a procedure for creating a neighboring sink list by a sink according to an embodiment of the present invention.

FIG. 3 is a flowchart illustrating a procedure for creating a neighboring sink list by a sink according to an embodiment of the present invention.

In step 300, the first sink 11 periodically broadcasts a HELLO message, a time stamp, v[0], and cert_S1, as described with reference to FIG. 2.

In step 301, the second sink 12 receives the HELLO message, the time stamp, v[0], and cert_S1, broadcasted by the first sink 11, verifies the received cert_S1 through the use of the public key pk_BS of the BS, and verifies the received v[0] through the use of a verified pk_S1. Through this, the second sink 12 can verify that the received pk_S1 is a public key of the first sink 11, and can verify the validity of the received HELLO message and time stamp.

In step 302, the second sink 12 generates a random number R1 used to create a session key, and creates first encryption information "u[1]=E{pk_S1, S2|| S1|| R1|| h(R1)}" through the use of the verified public key pk_S1 of the first sink 11. Here, the first encryption information represents information obtained by encrypting the R1 and the hash value h(R1) of the R1 through the use of the public key pk_S1.

In step 303, the second sink 12 transmits a public key pk_S2 of the second sink 12 and a certificate cert_S2, representing that the public key of the second sink 12 is pk_S2, together with the created u[1], to the first sink 11. At this time, when transmitting the pieces of information to the first sink 11, the second sink 12 transmits information representing that a sender is the second sink 12 and a receiver is the first sink 11, together with the pieces of information.

In step 304, the first sink 11 decodes the received u[1] through the use of its own secret key sk_S1, and then extracts the R1 and h(R1).

Thereafter, in step 305, the first sink 11 compares a value, obtained by applying a hash function to the extracted R1, with the extracted h(R1), and verifies the validity of the R1. When the value obtained by applying the hash function to the extracted R1 is the same as the extracted h(R1), the first sink 11 determines the R1 to be valid.

In step 306, the first sink 11 generates a random number R2, and creates a first session key "K_S1S2=KDF(R1|| R2)" between the first sink 11 and the second sink 12 through the use of the random numbers R1 and R2. Here, KDF is the abbreviation of Key Derivation Function, which is a one-way function.

In step 307, the first sink 11 creates second encryption information "u[2]=E{pk_S2, S1|| S2|| R2|| h(K_S1S2|| R2)}" through the use of the public key pk_S2 of the second sink 12.

In step 308, the first sink 11 transmits the created u[2] to the second sink 12. At this time, when transmitting the u[2] to the second sink 12, the first sink 11 transmits information representing that a sender is the first sink 1 and a receiver is the second sink 12, together with the u[2].

In step 309, the second sink 12 decodes the received u[2] through the use of its own secret key sk_S2, and then extracts the R2, the K_S1S2, and the h(K_S1S2|| R2).

In step 310, the second sink 12 creates a second session key "K_S2S1=KDF (R1|| R2) through the use of the random numbers R1 and R2, compares a value, obtained by applying a hash function to the R2 and the created second session key, with the extracted h(K_S1S2|| R2), and verifies the validity of the extracted h(K_S1S2|| R2). That is, when the value obtained by applying a hash function to the R2 and the created second session key is the same as the extracted h(K_S1S2|| R2), the second sink 12 determines the extracted h(K_S1S2|| R2) to be valid.

In step 311, the second sink 12 creates session key validity determination information "v[3]=MAC{K_S2S1, S2|| S1|| ACK|| R1|| R2}" for determining the session key validity through the use of the second session key.

Thereafter, in step 312, the second sink 12 transmits a response message including the created v[3] to the first sink 11. At this time, when transmitting the response message to the first sink 11, the second sink 12 transmits information representing that a sender is the second sink 12 and a receiver is the first sink 11, together with the response message.

In step 313, the second sink 12 additionally stores an identifier of the first sink 11 and the public key pk_S1 of the first sink 11 in the neighboring sink list NSL_S2 of the second sink 12. Thereafter, the second sink 12 creates NSL authentication information sign{sk_S2, h(S2|| NSL_S2}, representing that the NSL_S2 is the neighboring sink list of the second sink 12, through the use of the secret key sk_S2 of the second sink 12, and stores the created NSL authentication information. Since the NSL authentication information sign{sk_S2, h(S2|| NSL_S2} is information to be used when a node requests authentication in the future, the NSL authentication information may be created and stored in advance.

In step 314, the first sink 11 creates the MAC{K_S2S1, S2|| S1|| ACK|| R1|| R2} through the use of the first session key, compares the created value with the received v[3], and verifies the validity of the received v[3]. That is, when the created value is the same as the received v[3], the first sink 11 can determine that the first sink 11 shares the R1 and R2 with the second sink 12.

In step 315, the first sink 11 additionally stores an identifier of the second sink 12 and the public key pk_S2 of the second sink 12 in the neighboring sink list NSL_S1 of the first sink 11. In this case, the neighboring sink list of the first sink 11 may be expressed as shown in Table 1 below.

TABLE 1

| Sink ID | Hashed Sink ID | Public Key | Session Key |
|---------|----------------|------------|-------------|
| S2      | h(S2)          | pk_S2      | K_S1S2      |
| ...     | ...            | ...        | ...         |
| S5      | h(S5)          | pk_S5      | K_S1S5      |

As shown in Table 1, the neighboring sink list according to an embodiment of the present invention may include a sink ID, a hashed sink ID, a public key, and a session key. Here, "h(S2)" represents a value obtained by compressing the ID of the second sink 12 by means of a hash function.

Thereafter, the first sink 11 creates NSL authentication information sign{sk_S1, h(S1|| NSL_S1}, representing that the neighboring sink list NSL_S1 is the neighboring sink list of the first sink 11, through the use of the secret key sk_S1 of the first sink 11, and stores the created NSL authentication information. Because the NSL authentication information sign{sk_S1, h(S1|| NSL_S1} is information to be used when a node requests authentication in the future, like the sign{sk_S2, h(S2|| NSL_S2}, the NSL authentication information sign{sk_S1, h(S1|| NSL_S1} may be created and stored in advance.

As described above, according to an embodiment of the present invention, each sink included in the sensor network searches for adjacent sinks and creates a neighboring sink list, so that it is possible to easily perform authentication, even without passing through a BS, upon authentication of a node.

Figure 4A:
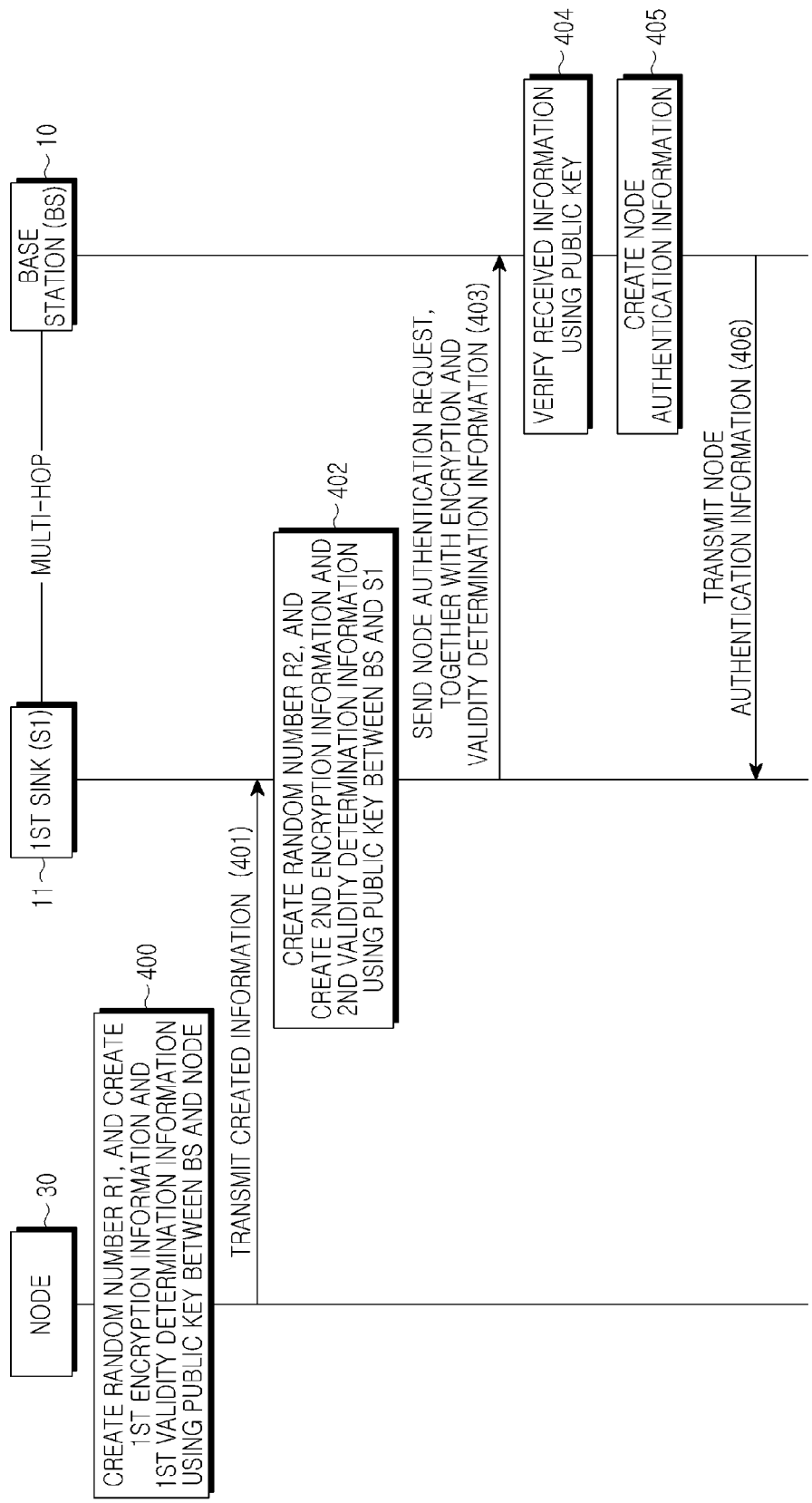
FIGS. 4A and 4B are a flowchart illustrating an initial authentication procedure between a node and a sink in a sensor network according to an embodiment of the present invention.
Figure 4B:
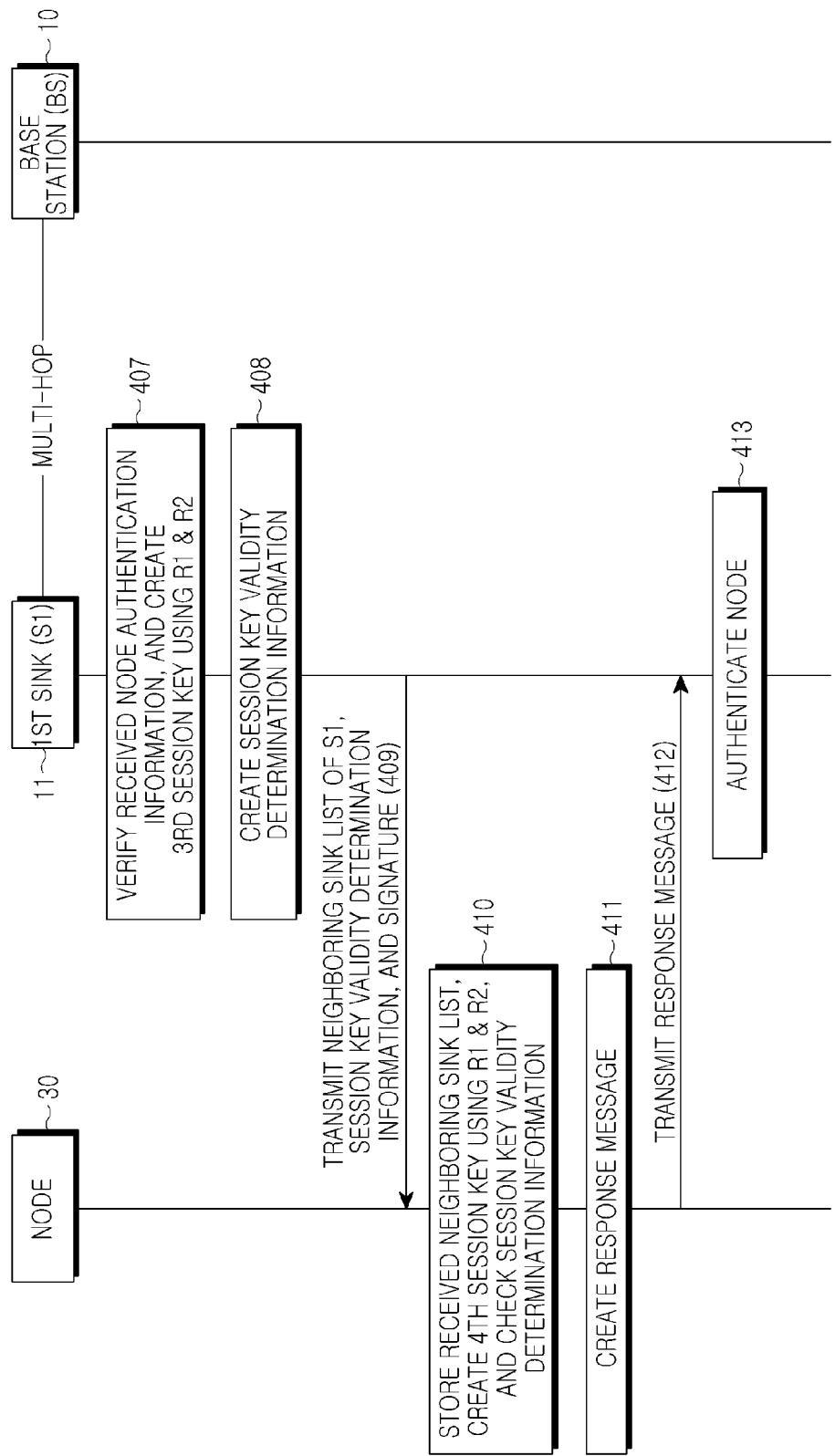

FIGS. 4A and 4B are flowcharts illustrating an initial authentication procedure between a node and a sink in a sensor network according to an embodiment of the present invention.

According to an embodiment of the present invention, the following description will be given on the proceeding operations after a node has received a HELLO message from the first sink 11.

In step 400, the node 30 creates a random number R1 in order to send an authentication request to the first sink 11, and creates first encryption information "u[1]=E{K_N, R1|| TS|| v[0]}" by encrypting the R1, TS, and v[0] through the use of a shared key K_N, which has been pre-shared with a BS. In addition, the node 30 creates first validity determination information "v[1]=MAC(K_N, N|| S1|| u[1])" through the use of the created u[1].

In step 401, the node 30 transmits the created u[1] and v[1] to the first sink 11. The node 30 transmits information representing that a sender is the node 30 and a receiver is the first sink 11, together with the u[1] and v[1].

In step 402, the first sink 11 creates a random number R2, and creates second encryption information "u[2]=E{K_S1, u[1]|| R2}" by encrypting the u[1] and R2 through the use of a public key K_S1, which has been pre-shared with the BS. In addition, the first sink 11 creates second validity determination information "v[2]=MAC(K_S1, S1|| BS|| N|| u[2]|| v[1])" through the use of the created u[2] and v[1].

In step 403, the first sink 11 transmits an authentication request for the node 30 to the BS 10, together with the received u[2] and the created v[1] and v[2]. The first sink 11 transmits information representing that a sender is the first sink 11, a receiver is the BS 10, and an authentication requester is the node 30, together with the authentication request.

In step 404, the BS 10 verifies received information through the use of the pre-shared K_N and K_S1. Specifically, the BS 10 creates MAC(K_S1, S1|| BS|| N|| u[2]|| v[1]) through the use of the K_S1, compares the created value with the v[2], and verifies the validity of the v[2]. That is, when the created value is the same as the v[2], the BS 10 determines that the u[2] and v[1] have been transmitted from the first sink 11.

Thereafter, the BS 10 decodes the u[2] through the use of the K_S1, extracts u[1] and R, creates MAC(K_N, N|| S1|| u[1]) through the use of the extracted u[1] and R, compares the created value with the v[1], and verifies the validity of the v[1]. That is, when the created value is the same as the v[1], the BS 10 can determine that the S1 and u[1] have been transmitted from the node 30.

The BS 10 decodes the u[1], extracts R1, TS, and v[0], and checks a signature of the v[0] through the use of the public key pk_S1 of the first sink 11, thereby verifying the validity of the TS.

In step 405, the BS 10 creates node authentication information. Specifically, the BS 10 creates "u[3]=E{K_N, R2}" by encrypting the R2 through the use of the K_N, and creates "v[3]=MAC(K_N, BS|| N|| S1|| u[3])" through the use of the created u[3]. Also, the BS 10 creates "u[4]=E{K_S1, R1|| h(K_N||R1)||u[3]|| v[3]}" by encrypting the R1, h(K_N||R1), u[3], and v[3] through the use of the K_S1, and creates "v[4]=MAC(K_S1, BS|| S1|| N|| R2|| u[4])" through the use of the R2 and u[4].

In step 406, the BS 10 transmits the created node authentication information u[4] and v[4] to the first sink 11. The BS 10 transmits information representing that a sender is the BS 10, a receiver is the first sink 11, and an authentication requester is the node 30, together with the u[4] and v[4].

In step 407 of FIG. 4B, the first sink 11 checks the node authentication information, and creates a third session key NK_N through the use of the R1 and R2. Specifically, the first sink 11 creates MAC(K_S1, BS|| S1||N|| R2|| u[4]) through the use of the K_S1, compares the created value with the v[4], and verifies the validity of the v[4]. That is, when the created value is the same as the v[4], the first sink 11 determines that the R2 and u[4] have been transmitted from the BS 10. The first sink 11 decodes the u[4] through the use of the K_S1, extracts the R1, h(K_N|| R1), u[3], and v[3], and creates the third session key "NK_N=KDF(R1|| R2)" through the use of the extracted R1 and R2.

In step 408, the first sink 11 creates session key validity determination information. Specifically, the first sink 11 creates "u[5]=E{NK_N, TS1|| NSL_S1|| t[1]}" by encrypting TS1, NSL_S1, and t[1] through the use of the NK_N, and creates "v[5]=MAC(NK_N, S1|| N|| R1|| u[5]) through the use of the R1 and u[5]. In addition, the first sink 11 creates signature information "t[1]=sign{sk_S1, h(S1|| NSL_S1)}" of the NSL_S1. The signature information may be created in a neighboring sink list creation process in advance.

In step 409, the first sink 11 transmits the neighboring sink list NLS_S1 and the signature to the node 30, together with the created u[3], v[3], u[5], and v[5]. The first sink 11 transmits information representing that a sender is the first sink 11 and a receiver is the node 30, together with the pieces of information.

In step 410, the node 30 stores a received NSL_S1, creates a fourth session key NK_N through the use of the R1 and R2, and then checks received u[3], v[3], u[5], and v[5].

Specifically, the node 30 creates MAC(K_N, BS|| N|| S1|| u[3]) through the use of the K_N, compares the created value with the received v[3], and verifies the validity of the received v[3]. That is, when the created value is the same as the v[3], the node 30 can determine that the S1 and u[3] have been transmitted from the BS 10. In addition, the node 30 decodes the u[3] through the use of the K_N, extracts the R2, and creates the fourth session key "NK_N=KDF(R1|| R2)" through the use of the R1 and R2.

Thereafter, the node 30 creates MAC(NK_N, S1|| N|| R2|| u[5]) through the created fourth session key, compares the crated value with the v[5], and verifies the validity of the v[5]. That is, the node 30 can verify that the R2 and u[5] have been transmitted from the first sink 11.

In step 411, the node 30 creates a response message to node authentication. Specifically, the node 30 decodes the u[5] through the use of the fourth session key, extracts the TS1 and t[1], creates "v[6]=MAC(NK_N, N|| S1|| ACK|| R2|| R1)" through the use of a node authentication response ACK, the R1, and the R2, and then creates a node authentication response message including the created v[6].

In step 412, the node 30 transmits the created node authentication response message to the first sink 11. The node 30 transmits information representing that a sender is the node 30 and a receiver is the first sink 11, together with the created node authentication response message.

In step 413, the first sink 11 performs node authentication according to the node authentication response message. Specifically, the first sink 11 creates MAC(NK_N, N|| S1|| ACK|| R2|| R1) through the use of the third session key, and compares the created value with the received v[6], and determines whether or not to authenticate the node 30.

As described above, according to an embodiment of the present invention, a result of an authentication between a node and a sink is stored in a neighboring sink list which has been created in advance, so that re-authentication between a node and a sink can be easily performed without the participation of a BS.

Figure 5:
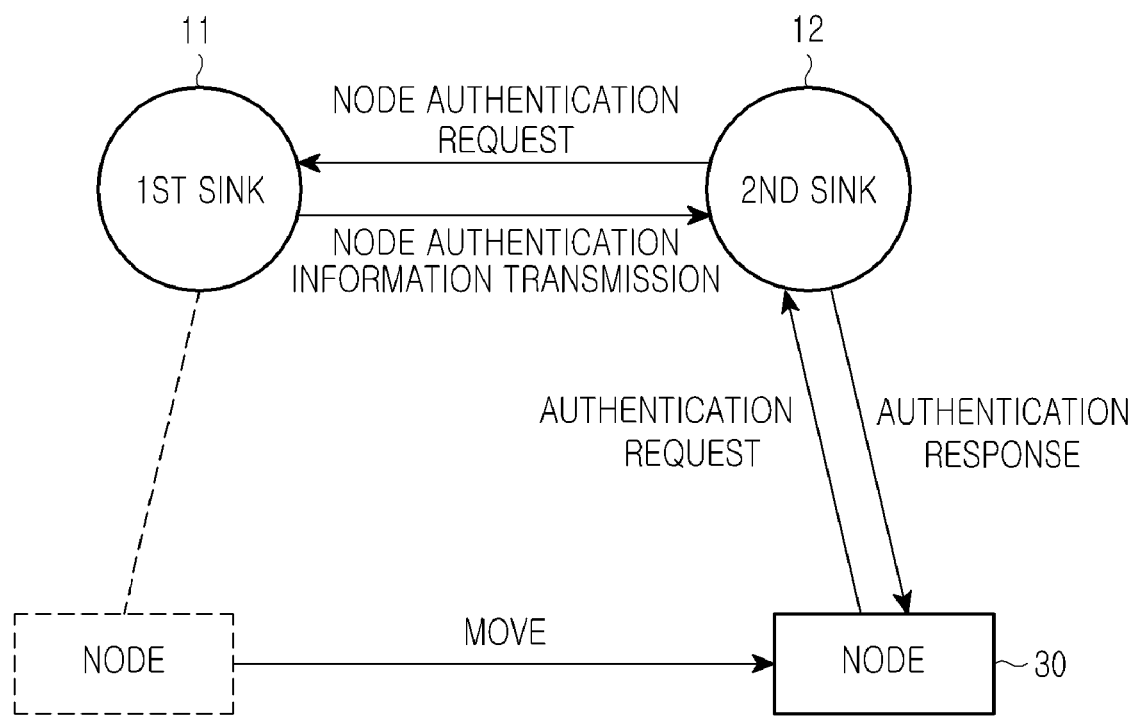
FIG. 5 is a block diagram illustrating an authentication process between a node and a second sink when the node has been already authenticated with a first sink and has moved to be connected to the second sink according to an embodiment of the present invention.

For example, as illustrated in FIG. 5, when the node 30 has been connected with the first sink 11, and node authentication has been accomplished, when the node 30 moves to a location near the second sink 12, the node 30 again receives authentication from the BS 10 in the prior art. In contrast, according to an embodiment of the present invention, when the node 30 sends an authentication request to the second sink 12, the second sink 12 sends a node authentication request to the first sink 11, which has performed authentication of the node 30, among adjacent sinks using a neighboring sink list. When receiving node authentication information from the first sink 11, the second sink 12 transfers a response to the authentication request to the node 30, so that it is possible to easily perform re-authentication of a node without passing through the BS 10.

This will now be described in detail with reference to FIGS. 6A and 6B.

Figure 6A:
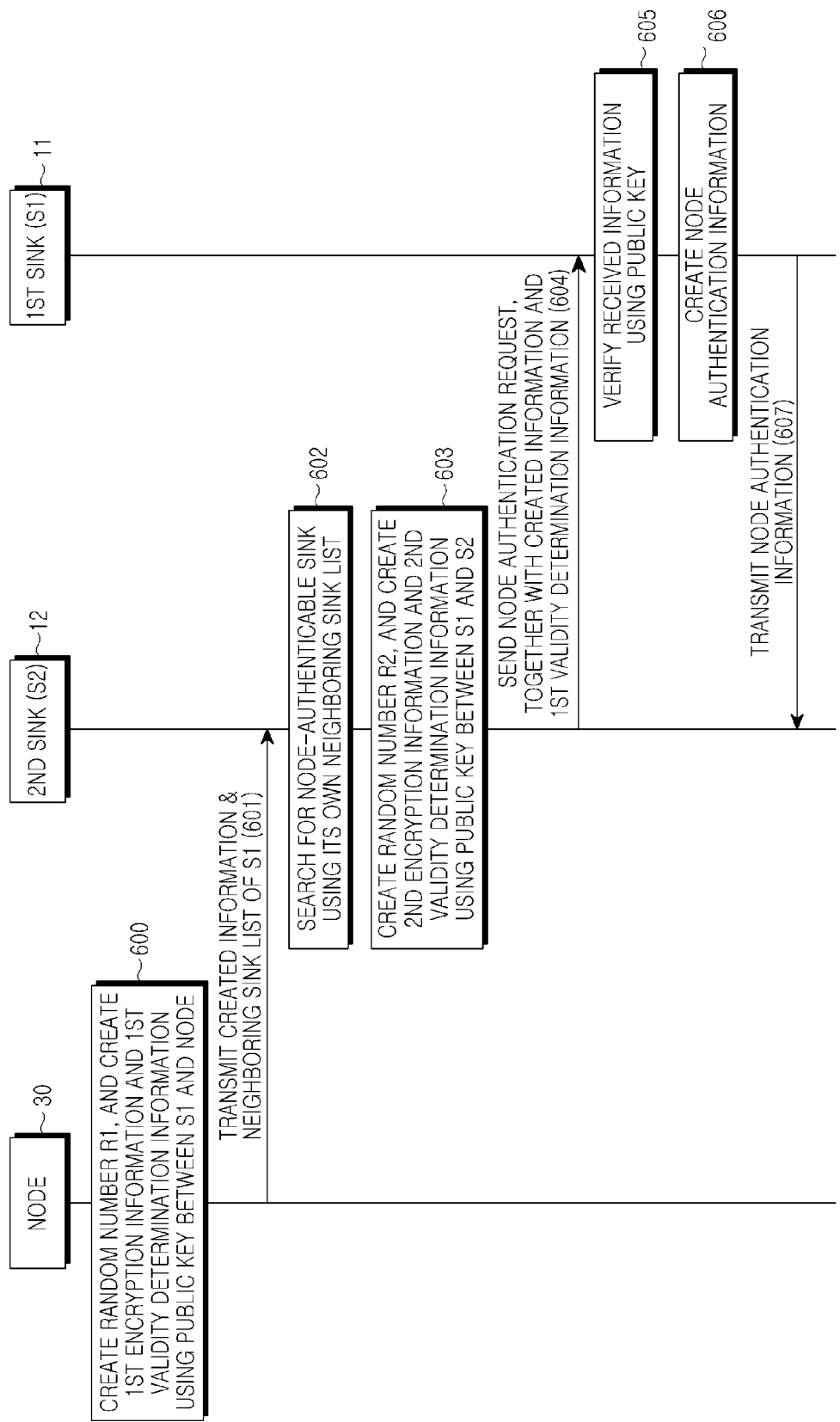
FIGS. 6A and 6B are a flowchart illustrating a procedure for re-authentication between a node and a sink in a sensor network according to an embodiment of the present invention.
Figure 6B:
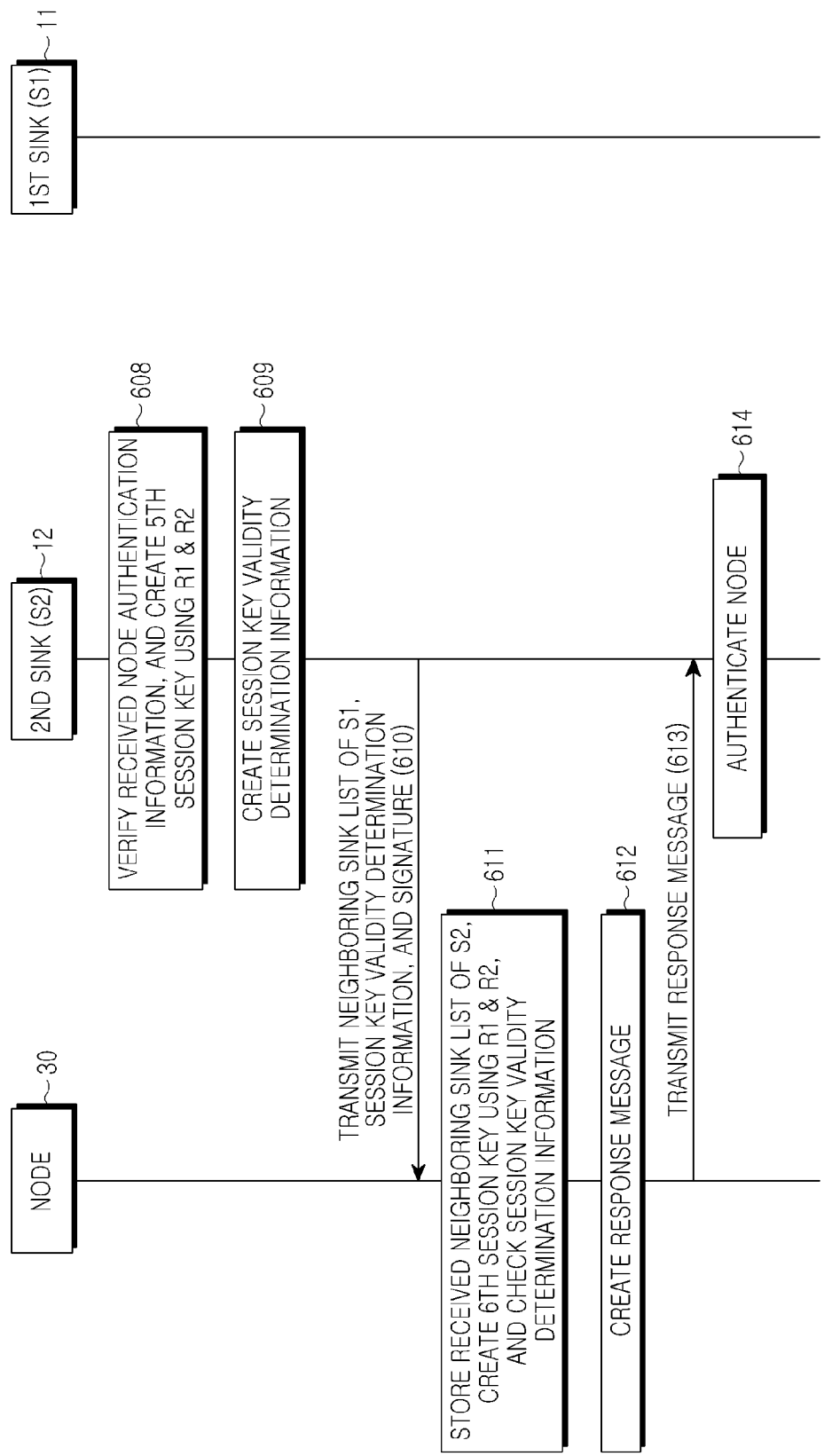

FIGS. 6A and 6B are flowcharts illustrating a procedure for re-authentication between a node and a sink in a sensor network according to an embodiment of the present invention.

An embodiment of the present invention as will be described below is directed to a node 30 that performs authentication with a first sink 11, and then moves to a location near a second sink 12, which is an adjacent sink of the first sink 11, as shown in FIG. 5. In addition, it is assumed that the second sink 12 and the first sink 11 are operationally connected to each other by one hop.

Also, this embodiment of the present invention will be described with reference to operations after the node 30 has received a HELLO message from the second sink 12.

In step 600, the node 30 creates a random number R1 in order to send an authentication request to the second sink 12, and creates first encryption information "u[1]=E{NK_N, R1}" by encrypting the R1 through the use of a shared key NK_N, which has been pre-shared with the first sink 11. In addition, the node 30 creates first validity determination information "v[1]=MAC(NK_N, N∥ S2∥ t[1] ∥ v[0])" through the use of the created u[1].

In step 601, while the node 30 transmits the created u[1] and v[1], a signature t[1], and a stored NSL_S1 to the second sink 12, the node 30 requests node authentication. The node 30 transmits information representing that a sender is the node 30 and a receiver is the second sink 12, together with the pieces of information.

Figure 7:
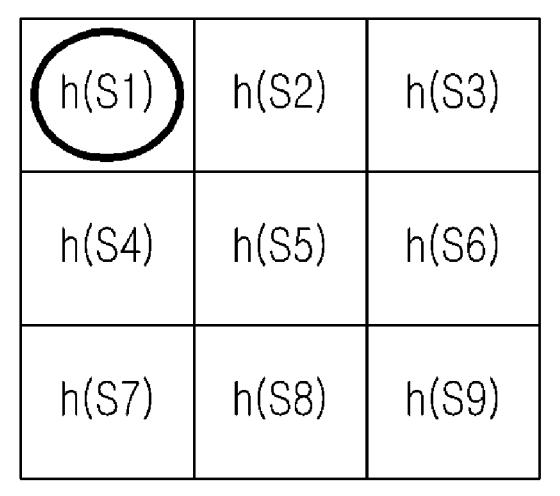

In step 602, the second sink 12 searches its own NSL_S2 for an adjacent sink which can authenticate the node 30. That is, the second sink 12 checks if there is the first sink 11 in the NSL_S2 as shown in FIG. 7, and verifies that the first sink 11 is an adjacent sink capable of authenticating the node 30.

In step 603, the second sink 12 creates a random number R2 in order to send an authentication request to the first sink 11, and creates second encryption information "u[2]= E{K_S1S2, u[1] ∥ v[0] ∥ R2}" by encrypting the u[1] and R2 through the use of a shared key K_S1S2, which has been pre-shared with the first sink 11. In addition the second sink 12 creates second validity determination information "v[2]=MAC(K_S1S2, S1∥ S2∥ N∥ u[2] ∥ v[1])" through the use of the u[2] and v[1].

In step 604, the second sink 12 transmits an authentication request for the node 30 to the first sink 11, together with the v[1], v[2], and u[2]. The second sink 12 transmits information representing that a sender is the second sink 12, a receiver is the first sink 11, and an authentication requester is the node 30, together with the authentication request.

In step 605, the first sink 11 verifies received information v[1], v[2], and u[2] through the use of the pre-shared NK_N and K_S1S2. Operations performed in steps 605 to 614 are similar to those performed in steps 404 to 413, so a detailed description thereof will be omitted. However, in steps 605 to 614, the first sink 11 performs an authentication operation in step 605 in place of the BS 10, a shared key between the first sink 11 and the node 30 is used in place of a shared key between the BS 10 and the node 30, and a shared key between the first sink 11 and the second sink 12 is used in place of a shared key between the BS 10 and the first sink 11, which are differences from steps 404 to 413.

In step 606, the first sink 11 creates node authentication information. Specifically, the first sink 11 creates node authentication information, including information obtained by encrypting the R2 through the use of the NK_N and information for validity determination.

In step 607, the first sink 11 transmits the created node authentication information to the second sink 12. In step 608, the second sink 12 checks the node authentication information, and creates a fifth session key through the use of the R1 and R2. In step 609, the second sink 12 creates session key validity determination information through the use of signature information of the NSL_S2, which has been created in advance in a step of creating a neighboring sink list. In step 610, the second sink 12 transmits the created session key validity determination information to the node 30, together with NSL_S2. In step 611, the node 30 stores a received NSL_S2, creates a sixth session key through the use of the R1 and R2, and then checks the session key validity determination information. Thereafter, the node 30 creates a node authentication response message in order to confirm whether or not the node 30 is authenticated. In step 613, the node 30 transmits the created node authentication response message to the second sink 12. In step 614, the second sink 12 performs node authentication according to the node authentication response message.

As described above, according to an embodiment of the present invention, re-authentication between a node and a first sink is performed, the node is re-authenticated through a second sink, which has authenticated the node in advance, the re-authentication between the node and the first sink can be easily performed without the participation of a BS.

The embodiment of the present invention as described above with reference to the case where a sink, having performed authentication with a node, is at a one-hop distance from another sink to perform re-authentication with the node.

Another embodiment of the present invention will now be described with reference to a sink, having performed authentication with a node, is at a two-hop distance from another sink to perform re-authentication with the node with reference to FIGS. 8A and 8B.

Figure 8A:
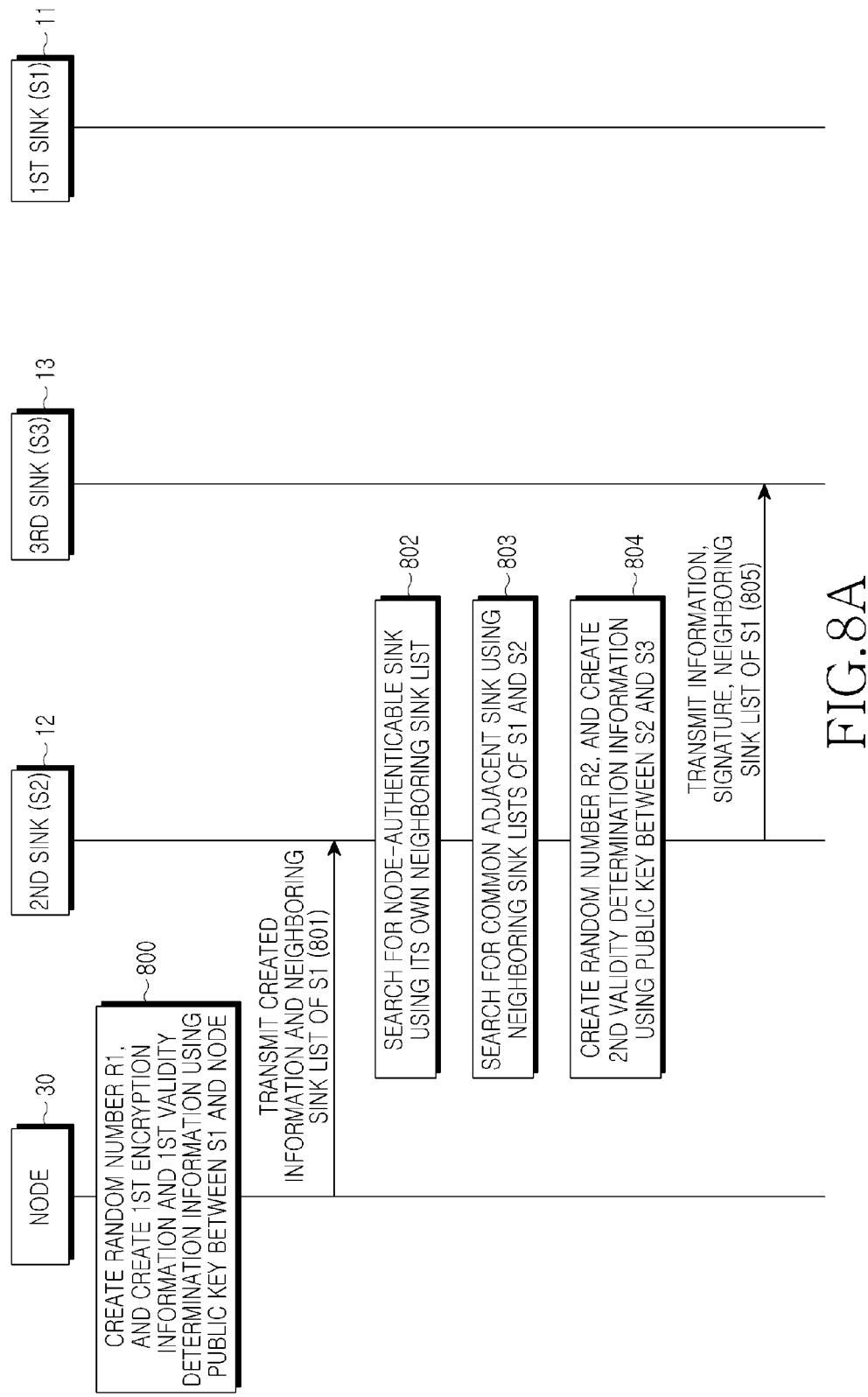
FIGS. 8A and 8B are a flowchart illustrating a procedure for performing re-authentication between a node and a sink in a sensor network according to an embodiment of the present invention.
Figure 8B:
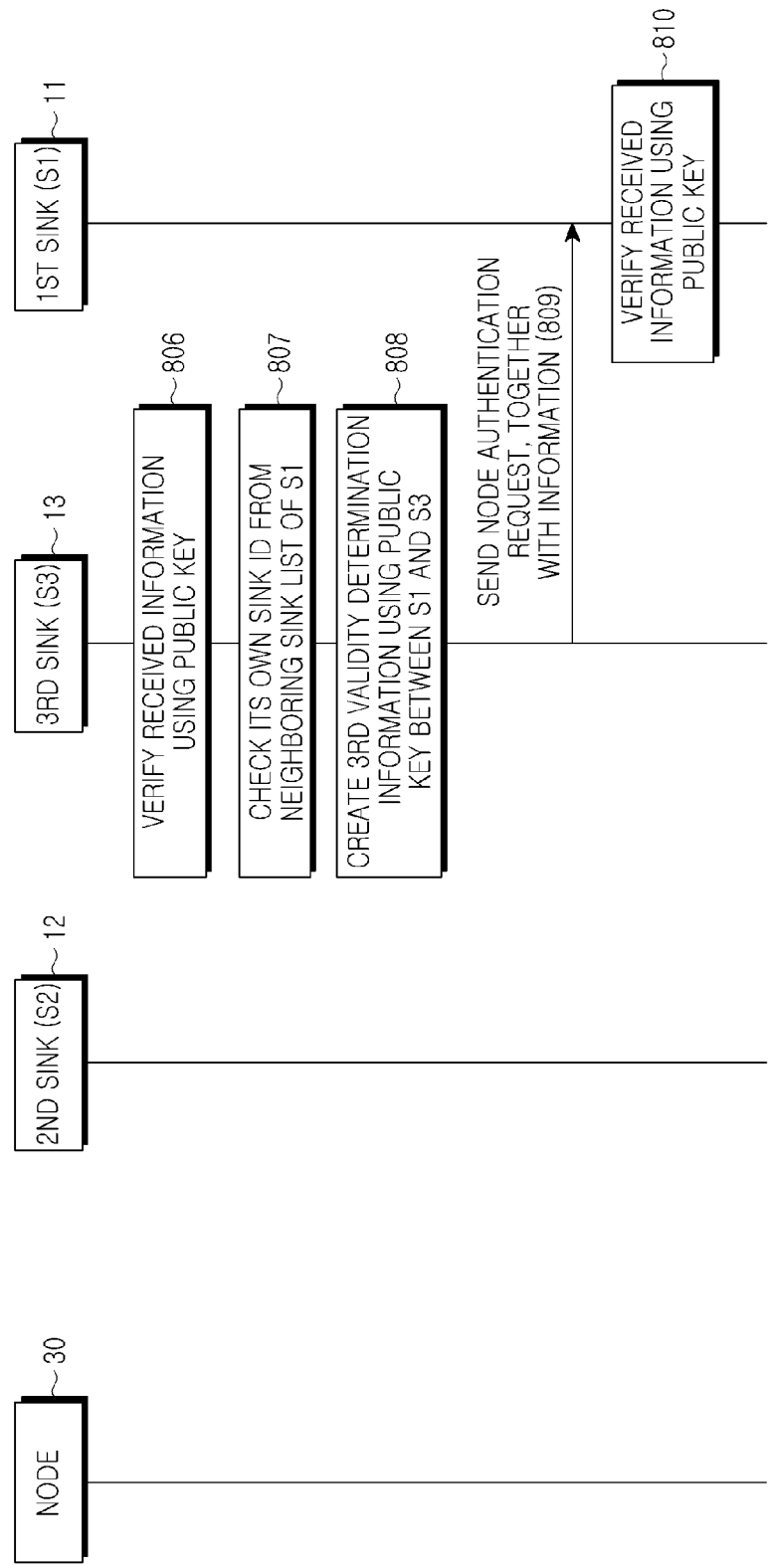

FIGS. 8A and 8B are flowcharts illustrating a procedure for performing re-authentication between a node and a sink in a sensor network according to an embodiment of the present invention.

According to this embodiment of the present invention, it is assumed that a first sink 11 and a third sink 13 are located at a one-hop distance from each other, the first sink 11 and a second sink 12 are located at a two-hop distance from each other, and the second sink 12 and the third sink 13 are located at a one-hop distance from each other.

In the embodiment of the present invention, that will be described below, a node 30 moves to the second sink 12, which is not an adjacent sink of the first sink 11 having authenticated the node 30 in advance. In addition, the embodiment of the present invention below will be described on the operations after the node 30 has also received a HELLO message from the second sink 12.

In step 800, the node 30 creates a random number R1 in order to send an authentication request to the second sink 12, and creates first encryption information u[1] and first validity determination information v[1] through the use of a shared key NK_N, which has been pre-shared with the first sink 11.

In step 801, while the node 30 transmits a neighboring sink list NSL_S1 of the first sink 11 to the second sink 12, together with the created first encryption information and first validity determination information, the node 30 requests node re-authentication. The operation performed in steps 800 and 801 are the same as those performed in steps 600 and 601 of FIG. 6, so a detailed description thereof will be omitted.

Figures 9A, 9B:
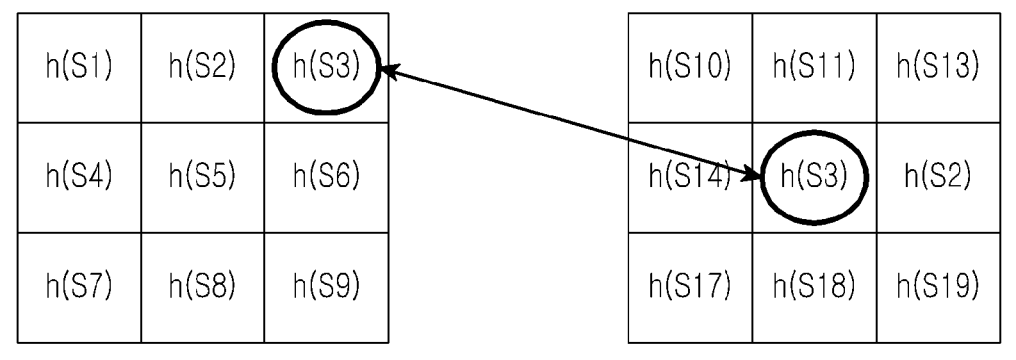

In step 802, the second sink 12 searches its own NSL_S2 for an adjacent sink capable of performing node authentication. That is, the second sink 12 checks if there is information on the first sink 11 in the NSL_S2 of the second sink 12, which is configured as shown in FIGS. 9A and 9B.

When there is no information on the first sink 11 in the NSL_S2 of the second sink 12, the second sink 12 compares the received NSL_S1 with the NSL_S2 of the second sink 12, and searches for a common adjacent sink which is adjacent to both the first sink 11 and the second sink 12 in step 803. For example, when the NSL_S1 of the first sink 11 is configured as shown in FIGS. 9A and 9B, the second sink 12 compares the two neighboring sink lists with each other, and verifies information on the third sink 13 which is a common adjacent sink.

In step 804, the second sink 12 creates a random number R2 in order to send an authentication request to the first sink 11, and creates second validity determination information "v[2]=MAC(K_S2S3, S2∥ S3∥ N∥ NSL_S1∥ t[1] ∥ u[1] ∥ v[1])" through the use of a shared key K_S2S3 which has been pre-shared with the third sink 13.

In step 805, the second sink 12 transmits the NSL_S1, the signature t[1], the first encryption information, and the first validity determination information, which have been received, as well as the created second validity determination information, to the third sink 13. The second sink 12 transmits information representing that a sender is the second sink 12, a receiver is the third sink 13, and an authentication requester is the node 30, together with the pieces of information.

In step 806 of FIG. 8B, the third sink 13 verifies the NSL_S1, the t[1], the u[1], and the v[1], which are pieces of received information, through the use of the pre-shared NK_N and K_S2S3. Specifically, the third sink 13 creates MAC(K_S2S3, S2∥S3∥N∥NSL_S1∥t[1]∥u[1]∥v[1]) through the use of the NSL_S1, t[1], u[1], and v[1], compares the created value with the v[2], and verifies the validity of the v[2]. That is, the third sink 13 can verify that the NSL_S1, t[1], u[1], and v[1] have been transmitted from the second sink 12. Also, the third sink 13 verifies the signature "t[1]=sign{sk_S1, h(S1∥ NSL_S1)}" through the use of the public key pk_S1 of the first sink 11.

In step 807, the third sink 13 checks its own sink identifier in the received NSL_S1, and verifies that the first sink 11 is a node-authenticable sink.

In step 808, the third sink 13 creates third validity determination information "v[3]=MAC(K_S1S3, S3∥ S1∥ S2∥ N∥ u[1] ∥ v[1])" through the use of a shared key K_S1S3 which has been pre-shared with the first sink 11.

In step 809, while the third sink 13 transmits the u[1], v[1], and v[3] to the first sink 11, the third sink 13 requests node authentication. The third sink 13 transmits information representing that a sender is the third sink 13, a receiver is the first sink 11, and an authentication requester is the node 30, together with the u[1], v[1], and v[3].

In step 810, the first sink 11 receives and verifies the information u[1], v[1], and v[3] through the use of the pre-shared NK_N and K_S1S2.

Although it is not illustrated in FIGS. 8A and 8B, a procedure after step 810 is similar to that after step 403, which has been aforementioned, and will now be briefly described.

The first sink 11 creates and transmits node authentication information to the third sink 13, and the third sink 13 receives and checks the node authentication information and creates second encryption information u[2] and fourth validity determination information v[4]. Also, the third sink 13 transmits the created second encryption information and fourth validity determination information to the second sink 12.

The second sink 12 receives and checks the second encryption information and fourth validity determination information, and creates a seventh session key through the use of the R1 and R2. Thereafter, the second sink 12 creates and transmits session key validity determination information to the node 30, together with a second neighboring sink list.

The node 30 receives and stores the second neighboring sink list, creates an eighth session key through the use of the R1 and R2, and checks the session key validity determination information through the created eighth session key. Thereafter, the node 30 creates and transmits a node authentication message to the second sink 12 in order to confirm whether or not the node 30 is to be authenticated.

The second sink 12 performs node authentication according to the node authentication response message.

Figure 10:
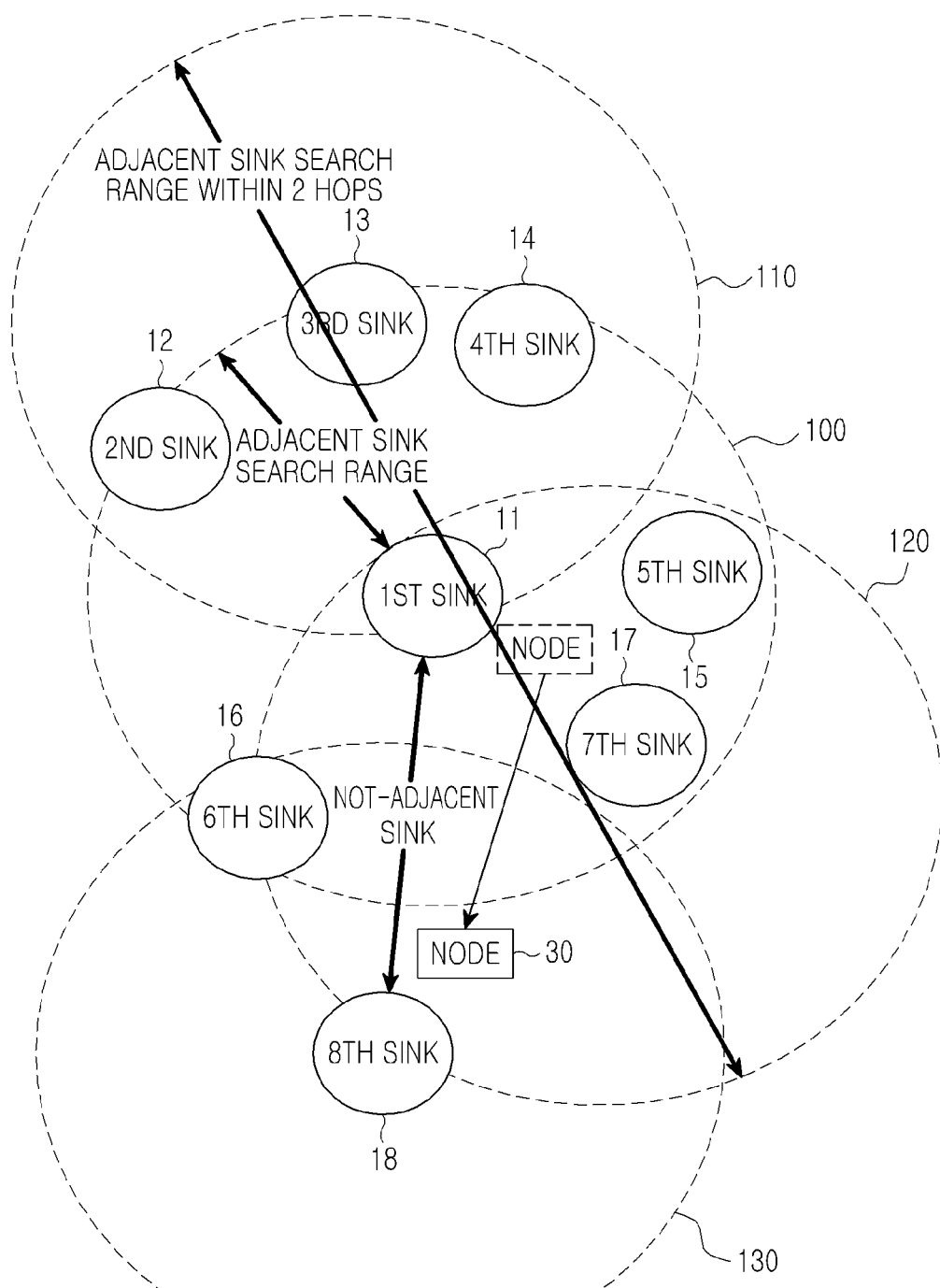
FIG. 10 is a view explaining an authentication process between a node and a sink when the node has been already authenticated and has moved in a sensor network according to an embodiment of the present invention.

Another embodiment of the present invention will be described wherein, after performing authentication with the first sink 11, the node 30 leaves an adjacent sink search range 100 of the first sink 11 and moves into an adjacent sink search range 130 of an eighth sink 18, as illustrated in FIG. 10.

When the node 30 sends an authentication request to the eighth sink 18, the eighth sink 18 sends a node authentication request to a sixth sink 16, which is a common adjacent sink in a neighboring sink list of the eighth sink 18 itself and a neighboring sink list received from the node 30. Thereafter, the sixth sink 16 sends a node authentication request to the first sink 11, receives node authentication information from the first sink 11, and forwards the node authentication information to the eighth sink 18, thereby performing re-authentication.

When the node 30 connected to a seventh sink 17 moves and is again connected to a ninth sink 19, as shown in FIG. 1, authentication is requested to the base station, so that the authentication is performed through a four-hop distance according to the conventional method. However, according to the present invention, the authentication is performed through only a two-hop distance, so that the authentication can be performed more rapidly, and the efficiency of node re-authentication between sinks increases as the hop distance between the node and the base station increases.

As described above, according to the present invention, although a node moves to another area after performing authentication with a sink, the node can be re-authenticated by the sink which has been mutually authenticated with the node in advance, without re-authentication by the base station, so that re-authentication between the node and a sink can be performed more easily and rapidly.

According to the present invention, when the adjacent sink search and mutual authentication between sinks are performed through the use of a public key, mutual authentication between adjacent sinks can be performed without the participation of a base station. In addition, according to the present invention, when an authenticated node moves and is connected to another sink, authentication is performed through a sink already-authenticated with the node, without passing through a base station, so that the hop distance of communication required for authentication is minimized, it is possible to reduce the overhead of communication in a sensor network of a multi-hop environment, and it is possible to reduce the period of time required for authentication.

In addition, according to the present invention, because a public key used to re-authenticate a node is verified by a signature of a sink, the period of time required for the operation of the public key is minimized, thereby efficiently reducing the operation load of the node.

While the present invention has been shown and described with reference to certain embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. An apparatus of a second sink for authenticating a node in a sensor network, the apparatus comprising:
   a memory for storing node authentication information; and
   a processor configured to:
   send a request for the node authentication information to a first sink, when receiving a re-authentication request from the node;
   receive the node authentication information from the first sink;
   re-authenticate the node based on the node authentication information,
   periodically create a second neighboring sink list including information on at least one adjacent sink neighboring the second sink, and
   determine if a node-authenticable sink exists in the second neighboring sink list,
   check a common adjacent sink included in both a first neighboring sink list including information on at least one adjacent sink neighboring the first sink and the second neighboring sink list by comparing the first neighboring sink list and the second neighboring sink list, when the node-authenticable sink does not exist in the second neighboring sink list, and
   send a request for the re-authentication of the node to the checked common adjacent sink while transmitting the second neighboring sink list to the checked common adjacent sink.

2. The apparatus as claimed in claim 1, wherein the first sink sends a request for authentication of the node to a base station, when receiving an authentication request from the node, receives the node authentication information from the base station, authenticates the node based on the node authentication information, and periodically creates the first neighboring sink list.

3. The apparatus as claimed in claim 2, wherein, when authenticating the node, the first sink transmits the first neighboring sink list of the first sink to the node.

4. The apparatus as claimed in claim 3, wherein, when sending the re-authentication request, the node transmits the first neighboring sink list to the second sink.

5. The apparatus as claimed in claim 1, wherein the processor sends the request for the re-authentication of the node to the node-authenticable sink, when the node-authenticable sink exists in the second neighboring sink list.

6. The apparatus as claimed in claim 3, wherein the first sink periodically broadcasts a public key of the first sink to the one or more sinks, stores each public key received from the one or more sinks, performs authentication with the one or more sinks through use of the received public key, and updates the first neighboring sink list through use of a shared key created.

7. The apparatus as claimed in claim 5, wherein, after sending the request for the re-authentication of the node, the processor receives the node authentication information from the node-authenticable sink, performs the re-authentication of the node, and updates the second neighboring sink list through use of a shared key created.

8. The apparatus as claimed in claim 7, wherein, after performing the re-authentication of the node, the processor transmits the second neighboring sink list to the node.

9. The apparatus as claimed in claim 8, wherein the node stores the second neighboring sink list, received from the processor, in place of the first neighboring sink list stored in the node.

10. The apparatus as claimed in claim 1, wherein the common adjacent sink stores the second neighboring sink list, which has been received together with the re-authentication request from the second sink, determines if the node-authenticable sink exists in a third neighboring sink list of the common adjacent sink, and requests the re-authentication of the node to the node-authenticable sink when the node-authenticable sink exists in the third neighboring sink list.

11. A method for authenticating a node by a second sink in a sensor network, which comprises the node, a plurality of sinks, and a base station, the method comprising the steps of:
    receiving a request for re-authentication from the node;
    sending a request for node authentication information to a first sink according to the request for re-authentication;
    receiving the node authentication information from the first sink;
    re-authenticating the node;
    creating a second neighboring sink list including information on at least one adjacent sink neighboring the second sink;
    determining if a node-authenticable sink exists in the second neighboring sink list
    determining a common adjacent sink included in both a first neighboring sink list including information on at least one adjacent sink neighboring the first sink and the second neighboring sink list by comparing the first neighbor sink list and the second neighboring sink list, when the node-authenticable sink does not exist in the second neighboring sink list; and
    requesting the re-authentication of the node to the determined common adjacent sink while transmitting the second neighboring sink list to the checked common adjacent sink.

12. The method as claimed in claim 11, wherein the first sink sends a request for authentication of the node to a base station, when receiving an authentication request from the node, receives the node authentication information from the base station, authenticates the node based on the node authentication information, and periodically creates the first neighboring sink list.

13. The method as claimed in claim 12, further comprising receiving, from the first sink, the first neighboring sink list of the first sink to the node after the node authentication process.

14. The method as claimed in claim 13, wherein the node transmits the first neighboring sink list to the second sink after the re-authentication request step.

15. The method as claimed in claim 11, further comprising:
    sending the request for the re-authentication of the node to the node-authenticable sink, when the node-authenticable sink exists in the second neighboring sink list.

16. The method as claimed in claim 13, wherein the first sink periodically broadcasts a public key of the first sink to the plurality of sinks, receives stores each public key received from the plurality of sinks, performs authentication with the plurality of sinks through use of the received public key, and updates the first neighboring sink list through use of a shared key.

17. The method as claimed in claim 15, further comprising:
receiving the node authentication information from the node-authenticable sink after requesting the re-authentication of the node, and performing the re-authentication of the node; and
updating the second neighboring sink list through use of a shared key created while performing the authentication.

18. The method as claimed in claim 17, further comprising transmitting the second neighboring sink list to the node after performing the re-authentication of the node.

19. The method as claimed in claim 18, wherein the node stores the second neighboring sink list, received from the second sink, in place of the first neighboring sink list stored in the node.

20. The method as claimed in claim 11, wherein the common adjacent sink stores the second neighboring sink list, which has been received together with the re-authentication request from the second sink, determines if the node-authenticable sink exists in a third neighboring sink list of the common adjacent sink, and requests the re-authentication of the node to the node-authenticable sink, when the node-authenticable sink exists in the third neighboring sink list.

* * * * *